Nov. 1, 1949     M. E. MILLER     2,486,964

ELECTRICAL ACCUMULATION

Filed May 23, 1949

Inventor:
Monroe E. Miller

Patented Nov. 1, 1949

2,486,964

UNITED STATES PATENT OFFICE 2,486,964

ELECTRICAL ACCUMULATION

Monroe E. Miller, Washington, D. C.

Application May 23, 1949, Serial No. 94,879

15 Claims. (Cl. 320—1)

The primary object of this invention is to provide a novel method of and means for accumulating electrical energy without the use of a liquid.

Another object is to provide a simple electrical accumulator or storage cell which is relatively light in weight and long-lived as compared with storage cells used heretofore.

The invention contemplates the attainment of said objects for the accumulation either of a charge of one polarity or of complementary charges of opposite polarities.

In the accompanying drawings—

Figure 1:
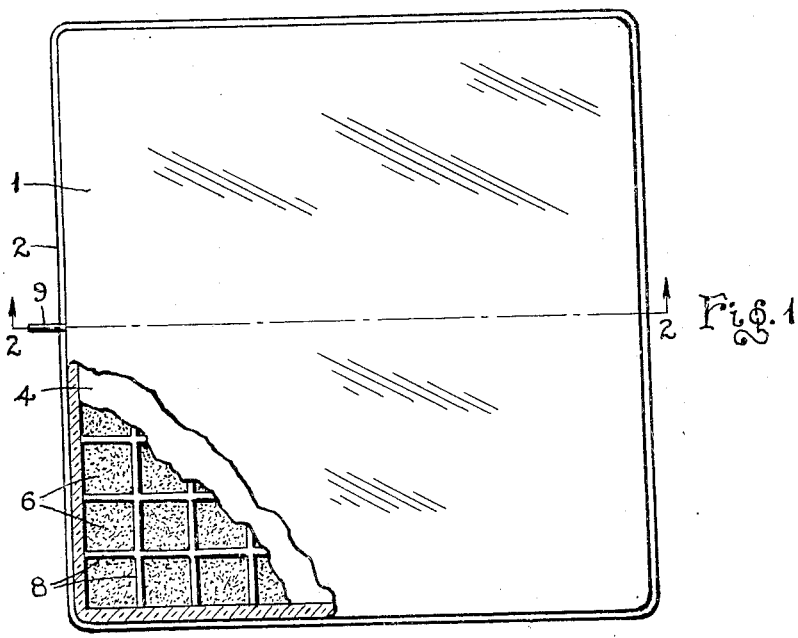
Figure 1 is a plan view of one form of an accumulator embodying the invention, with portions broken away.
Figure 2:
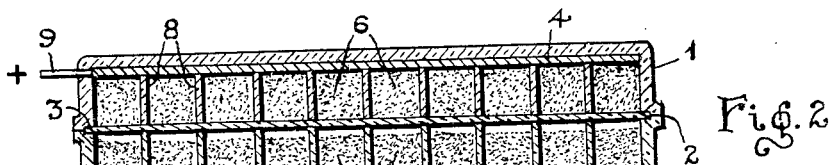
Fig. 2 is a section on the line 2—2 of Fig. 1.

As shown in Figs. 1 and 2, a suitable case or shell 1 of glass or other suitable imporous electrical insulating material is provided. This case is composed of two tray-like sections having their rims fused or cemented together, as at 2, with the edge portions of a partition 3 secured between said rims so the partition divides the case into two chambers. The partition is of glass or other insulating material so the two chambers are independent of each other. On the bottoms of the two sections of the case are plates 4 and 5 of any suitable metal, so in the assembly as shown the plate 4 is at the top of the upper chamber and the plate 5 is at the bottom of the lower chamber. Between the partition 3 and plate 4 is lamp black or gas carbon, a powder metal, or other ionizable conductive powder 6, and between said partition and the plate 5 is a similar or complementary powder 7. Sufficient powder is used in each chamber for best results as determined by tests, and the gas in each chamber is exhausted therefrom as much as practical so the chamber is vacuous, excepting in the use of such powders when the presence of a gas not so rarified either does not interfere with the desired functioning of the particular powder as hereinafter described or may be conducive to better action than with maximum vacuousness.

In order to keep the powder in each chamber distributed throughout the area of the horizontal partition 3, vertical partitions 8 may be disposed between the partition 3 and the metal plates. The partitions 8 extend in different directions so as to divide and separate the powder, and they are of glass or other electrical insulating material.

Wires 9 and 10 are secured to the respective plates 4 and 5 and extend through the wall of the case for making electrical connections.

The bipolar cell thus provided may be used in different ways for accumulating electrical energy. The method according to one use of said means consists in withdrawing electrons from the powder 6 and supplying electrons to the powder 7. The charging of the cell may be done from any suitable source or sources of electrical energies of opposite polarities. Although the conventional plus and minus symbols are used in Fig. 2 for the respective wires 9 and 10, it must be understood that such symbols are reverse with respect to electronic charges, it now being well recognized that the movement of electrons along a conductor constitutes the actual current.

The wire 9 is subjected to electrical tension by having electrons withdrawn therefrom. This is done by a dynamo, static machine, electrophorous or other source of what has been called positive energy. Electrons are drawn through the wire 9 from the plate 4 which, according to usual conventions, could be regarded as an anode. In the uncharged condition of the cell, the powder 6 fills the space between the partition 3 and plate 4. Therefore when electrons are withdrawn from the plate 4, the particles of powder which contact with or close to said plate have electrons taken from them, and thus the electrical tension, due to a dirth of electrons, extends into the powder of the tension chamber.

The wire 10 is subjected to electrical pressure by having electrons supplied thereto while the wire 9 is under electrical tension. The electrons are supplied by a dynamo, static machine, electrophorous or other source of what has been called negative energy. One wire may be grounded when the other wire is subjected to a charge opposite to that to which the grounded wire is subjected, which enables lightning to be arrested and trapped. Electrons are supplied through the wire 10 to the plate 5 which, according to the usual conventions, could be called a cathode. In the uncharged condition of the cell, the powder 7 rests by gravity on the plate 5. Therefore the uppermost particles, or the conglomerations or unions thereof, may be loose from or spaced from the partition 3. As electrons pass to the plate 5 they enter the powder thereon, and thus the electrical pressure extends into the powder of the pressure chamber.

The action in the two chambers is complementary, an the particles of powder in each chamber are intimately corelated or in contact so electrons pass from particle to particle. It is well known that the atoms of all known elements include electrons and that such electrons can be taken from and added to the atoms, so as to go from atom to atom. This transfer of electrons apparently accounts for the distribution of electrical charges in or on condenser plates and other charged bodies and also for the flow of electrons along a wire, as current moving in the direction opposite to that according to the conventional designations used heretofore. The particles of powder which have lost electrons to the tension exerted through the plate 4 become ionized positively according to the conventional terminology or negatively with respect to the electronic condition thereof, and the loss of electrons gives the particles a tendency to attract electrons. When the plate 4 has a positive static charge and the plate 5 has a negative static charge, as when the plates form a condenser having an electrical field between them, the electrical tension of the powder 6 extends down through the partition 3. The ionization of the powder 7 is negative according to the conventional terminology or is positive with respect to the electronic condition thereof. The electrons going into the powder 7 will cause the particles to become less conglomerated or combined, the individual charges of the particles giving them a tendency to repel each other, so the uppermost particles being free will rise, as the oppositely-charge particles in the two chambers are attracted toward each other and gather at the opposite surfaces of the partition 3. It is well known that a positively-charged particle and a negatively-charged particle are attracted to each other if they are sufficiently near to each other and are free to move, and that, in an electrical field between an anode and a cathode, positively-charged particles or cations will move toward the cathode while negatively-charged particles or anions will move toward the anode.

As the charging is continued, and electrons are taken from the powder 6 and electrons are added to the powder 7, the mutual attraction of the particles in the upper and lower chambers causes as many as possible of the particles to seek each other as for a completion of the circuit between the plates 4 and 5. The partition keeps the electrically-charged particles separated as they gather together, and the layers of particles which bear against the partition are in a condenser relationship, although the particles are not like solid metal plates which are charged and discharged suddenly. Since it requires more time for the electrons to move from particle to particle in the powders 6 and 7 than in condenser plates, and since the particles have inertia and do not move as fast as electrical energy moves in a circuit, the action is slower and more prolonged than with an ordinary condenser, both for charging and discharging of the cell. In that respect the device is a slow-acting condenser. However, unlike the usual condenser, the particles of powder may be accumulated to some depth above and below the partition 3, since their mutual attraction through the partition will overcome to some extent the tendency for electrically-charged particles in either chamber to repel each other.

In fully charged condition, the powders 6 and 7 are drawn toward each other as much as possible, and are condensed to some extent due to their mutual attraction, but loose particles farthest from the partition 3 are still in contact with the plates 4 and 5, with which said powders need continuous connections.

The discharging action is in general respects reverse to the charging action. When a circuit is closed between the wires 9 and 10, the oppositely-charged particles have a way for obtaining an equilibrium as for their electronic conditions, but the discharge is not sudden, as it is with a Leyden jar or condenser. The particles which contact with the plates 4 and 5 will cause electrons to be drawn through the wire 9 from the wire 10, thereby establishing the flow of electrons from the powder 7 and into the powder 6. As the electrons are discharged from the powder 7 and enter the powder 6, the particles in the two chambers are relieved, and the particles seek the plates in an exchange of charges. As the powder 6 is relieved of electrical tension, the particles thereof become less crowded, conglomerated or combined at the partition, and they return to discharged condition. The powder 7 is simultaneously relieved of its electrical pressure, and the particles thereof drop and become conglomerated or combined toward the plate 5 in returning to discharged condition by the loss of electrons through the plate 5. The density of the powder in each chamber becomes more uniform when the particles are no longer attracted by the powder in the opposite chamber, and when the cell is fully discharged the powders 6 and 7 are in a balanced condition, as an electrical equilibrium is attained, so the electronic condition of one powder is not much different from that of the other. This may be substantially the same condition as when the cell is completed in the making thereof, although if possible the powders can be conditioned by some special treatment that may make them more suitable for the purposes herein explained.

It is possible to charge the powder 6 or the powder 7 without charging the other powder excepting by induction through the partition. Thus, a positively-charged body can be applied to the wire 9 to charge the plate 4 and powder 6, or a negatively-charged body can be applied to the wire 10 to charge the plate 5 and powder 7. In this manner, the plates 4 and 5 may be charged independently, and the oppositely-charged particles will be attracted toward each other, as when the plates are charged simultaneously. Obviously there is an inductive action through the partition from a charge in either powder.

The cell may be repeatedly charged and discharged indefinitely since the powders remain intact and there is little or no deterioration thereof. The cell is hermetically sealed and needs no attention. There is no liquid that evaporates or anything else that requires renewal or replacement. The cell can be used in cold surroundings without becoming inoperative due to freezing. The structure may also be relatively light in weight as compared with storage cells used heretofore for electrical power of the same amount, it being possible to make the parts thinner than shown in the drawings. As with battery cells and condensers, any number of the present cells can be connected in series or multiple for increasing the voltage or amperage. For series connections the cells are conveniently stacked on each other.

The finer the powder is the better the results should be, since within a given extent of space many small particles may yield or receive more electrons than fewer particles occupying the same extent of space, the aggregate superficial area of the small particles being greater than such area of the large particles. With some powders, either metallic or nonmetallic, a gas may be used, which may be rarefied to a desirable extent. The presence of a gas can retard the movement of the particles of powder so the action is not too fast, especially for discharging the cell. An inert gas may be used to increase electrical conductivity in the chambers, and an active gas may be used which will enter into chemical activity with the powders for enhancing ionization. A conductive gas will enable all of the particles of powder in either chamber to move from the metal plate in being attracted toward the partition 3.

As for the means and method described hereinbefore, this application is a continuation-in-part of application Serial No. 29,155, filed May 25, 1948, which in turn is a continuation-in-part of application Serial No. 739,974, filed April 7, 1947.

The bipolar cell comprises two unipolar cells in that the powder in either chamber may be given a static charge or a series of them for accumulating or storing electrical energy of one polarity. The two unipolar cells have independent chambers confining the respective powders therein and their inductive relation makes the cells serve as a bipolar cell. The lower chamber is particularly advantageous for use as a unipolar cell inasmuch as the powder is spaced from the top of the chamber and thereby allows for the separation of the particles due to the fact that the charged particles will repel each other. The powder may therefore expand when charged and the particles will settle down by gravity on the plate 5 and on each other as they yield their individual charges. Fractional charging and discharging is of course possible as with the use of both chambers.

Figure 3:
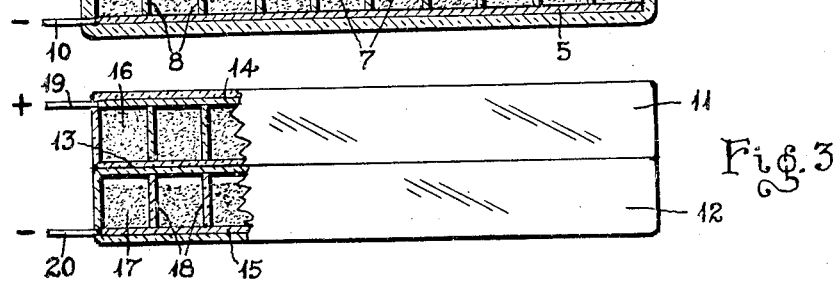
Fig. 3 is an elevation of another form of accumulator, partly shown in section to agree with Fig. 2.

Fig. 3 shows a pair of unipolar cells comprising the superposed chambers 11 and 12 whose bottom and top, respectively, are in contact and thereby provide an insulating partition 13 between the chambers. The plates 14 and 15, powders 16 and 17, partitions 18, and wires 19 and 20 are substantially the same as in Figs. 1 and 2, and the two unipolar cells may be used as a bipolar cell in the manner described hereinbefore, with charges given to the powders either simultaneously or alternately. The chambers can be separated when the powders are charged, so the charge of either chambers may be used, as for neutralizing an opposite charge of a body to which the plate of the cell is in contact or connection. The discharging of the device is also faster when the chambers are separated before an electric connection between them is completed, for which purpose the chamber 11 may be inverted to bring the plate 14 below the powder as in the chamber 12. When the charged cells are separated there is no longer such a strong mutual attraction of the two powders as when the cells were together, and there is a tendency for the charged particles in each cell to repel each other and be distributed throughout the cell. Therefore, the particles in the cells are more free to go to the metal plates than when the particles are mutually attracted away from said plates. The two cells may also be charged while separated and then placed together, or they may be used separately when unipolar energy is wanted. A unipolar cell may be used in lieu of an electrophorous for charging by induction a metal body placed against the cell opposite to the plate or conducting means 14 or 15. Unipolar cells can also be used as field inductors so as to provide electrical fields for various purposes.

Figure 4:
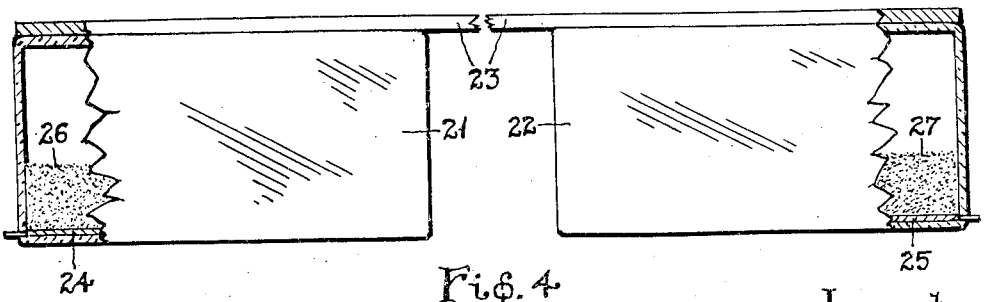
Fig. 4 is an elevation of still another embodiment of the invention, with portions broken away and shown in section.

Fig. 4 illustrates a further use of unipolar cells, both chambers 21 and 22 of which have their respective plates 24 and 25 below the powders 26 and 27, with a metal plate or bar 23 placed on the tops of the chambers for establishing an inductive relation of the two chambers as described hereinafter. The chambers are of greater depth than those shown in Figs. 2 and 3 and allow greater separation of the particles of powder. When the plates 24 and 25 are given static charges the particles at the top are repelled and as this repulsion of the particles continues and particles reach the tops of the chambers, induction through the plate 23 will draw the particles against the tops of the chambers. Thus when charged particles in either chamber reach the top of the chamber they will by induction draw an opposite charge in the plate 23 close to said particles and will repel a like charge. The repelled charge may exert an inductive influence down through the top of the other chamber so as to attract the oppositely-charged particles which are raised in the lastmentioned chamber. A charge in the plate 23 repelled by charged particles at the top of one chamber has a mutual attraction with the oppositely-charged particles in the other chamber. When charged particles of both chambers reach the tops of said chambers they are substantially in condenser relationship with the plate 23 which has induced charges opposite to those of the particles immediately below it. The mutual attraction of the particles and the charges induced in the plate 23 is effective for drawing the particles toward said plate. This is conducive to an accumulation of particles at the tops of the chambers. In this way the chambers can be given greater charges in the powders thereof than by charging them individually. The plate 23 may then be removed for using the two chambers either separately as unipolar cells or jointly as a bipolar cell.

What is claimed is:

1. The method of accumulating electrical energy consisting in conducting electrical energy of one polarity by way of conducting means to a conductive powder confined in a chamber, with the particles of said powder contacting in part with said means and intimately corelated so electrons pass from particle to particle.

2. The method of accumulating electrical energy consisting in conducting electrical energy of one polarity by way of conducting means to a conductive powder confined in a chamber and resting by gravity on and in contact with said means, with the particles of said powder intimately corelated so electrons pass from particle to particle, and with the powder spaced from the top of the chamber in the uncharged condition of the powder.

3. The method of accumulating electrical energy consisting in supplying electrical energy of one polarity to a conductive powder confined in a chamber and supplying electrical energy of opposite polarity to a conductive powder confined in another chamber, with the particles of each powder intimately corelated so electrons pass from particle to particle, and with an inductive relation between the powders so they have a mutual influence.

4. The method according to claim 3 wherein the chambers are so arranged that the powder in each chamber is attracted toward the other chamber by the mutual attraction of the powders.

5. The method of accumulating electrical energy consisting in supplying electrical energy of one polarity to a conductive powder at one side of an insulating partition and supplying electrical energy of opposite polarity to a conductive powder at the opposite side of said partition, with the particles of each powder intimately corelated so electrons pass from particle to particle, and with the particles of powder at the opposite sides of the partition attracted toward each other against said partition.

6. The method of accumulating electrical energy consisting in supplying electrical energy of one polarity by way of conducting means to a conductive powder in a chamber and supplying electrical energy of opposite polarity by way of conducting means to a conductive powder in another chamber separated from the firstnamed chamber by an insulating partition, with the particles of each powder intimately corelated so electrons pass from particle to particle, and with the particles of powder at the opposite sides of the partition attracted toward each other against said partition.

7. The method of accumulating electrical energy consisting in supplying electrical energy of one polarity by way of a metal plate to a conductive powder in a chamber and supplying electrical energy of opposite polarity by way of a metal plate to a conductive powder in another chamber separated from the firstnamed chamber by an insulating partition, with said plates in condenser relationship so as to have an electrical field between them, with the particles of each powder intimately corelated so electrons pass from particle to particle, and with the firstnamed powder resting on said partition and the secondnamed powder in uncharged condition spaced below said partition and in charged condition attracted upwardly toward said partition by the firstnamed powder when in charged condition.

8. An electrical accumulator comprising a chamber, a conductive powder confined therein whose particles are intimately corelated so electrons pass from particle to particle, and conducting means in contact with said powder for supplying it with electrical energy of one polarity.

9. An electrical accumulator according to claim 8 wherein, in the uncharged condition of the powder, it rests by gravity on said conducting means and is spaced from the top of the cell.

10. An electrical accumulator comprising two chambers, a conductive powder confined in each chamber with the particles of said powder intimately corelated so electrons pass from particle to particle, and means for supplying electrical energy of one polarity to the powder in one chamber and of opposite polarity to the powder in the other chamber, said chambers being so related that the firstnamed and secondnamed powders when charged are mutually attracted toward each other.

11. An electrical accumulator comprising two means for supplying electrical energy of opposite polarities, an insulating partition between said means, and a conductive powder between said partition and each of said means, contacting with said means and having the particles thereof intimately corelated so electrons pass from particle to particle whereby the particles of said powders in being given opposite charges from the two means are moved toward said partition in being attracted toward each other.

12. An electrical accumulator comprising two chambers having an insulating partition between them, a conductive powder in each chamber and having its particles intimately corelated so electrons pass from particle to particle, and conducting means contacting with the powder in each chamber for supplying it with electrical energy and enabling the two powders to be given opposite charges so the powders are moved toward said partition by their mutual attraction.

13. An electrical accumulator comprising two chambers having an insulating partition between them, a metal plate in each of said chambers for supplying electrical energy, said plates being in condenser relationship so as to have an electrical field between them when they are oppositely charged, and a conductive powder between each of said plates and said partition, contacting with the plate and having its particles intimately corelated so electrons pass from particle to particle whereby the particles of said powders in being given opposite charges in the two chambers are moved toward said partition in being attracted toward each other.

14. An electrical accumulator comprising two conductive powders whose particles are intimately corelated so electrons pass from particle to particle, insulation separating the two powders and through which the particles of each powder have an inductive relation with the particles of the opposite powder, and means for supplying electrical energy of one polarity to one powder and of the opposite polarity to the other powder.

15. An electrical condenser comprising two conducting means in condenser relationship, insulation between said means, and a conductive powder between said insulation and each of said means, with the powder contacting with the corresponding means and having its particles intimately corelated so electrons pass from particle to particle.

MONROE E. MILLER.

REFERENCES CITED

The following references are of record in the file of this patent:

UNITED STATES PATENTS

| Number | Name | Date |
|---|---|---|
| 2,290,526 | Berkey et al. | July 21, 1942 |

OTHER REFERENCES

"A Textbook of Physics," Duff, 1921, page 337.